United States Patent [19]

Friedman et al.

[11] 4,131,527

[45] Dec. 26, 1978

[54] METHOD FOR SELECTIVELY REDUCING PLUTONIUM VALUES BY A PHOTOCHEMICAL PROCESS

[75] Inventors: Horace A. Friedman; Louis M. Toth, both of Oak Ridge; Jimmy T. Bell, Kingston, all of Tenn.

[73] Assignee: The United States of America as represented by the United States Department of Energy, Washington, D.C.

[21] Appl. No.: 782,873

[22] Filed: Mar. 30, 1977

[51] Int. Cl.$^2$ .................... C01G 56/00; B01J 1/10
[52] U.S. Cl. ................... 204/157.1 R; 423/10; 423/251
[58] Field of Search ................ 423/10, 251; 204/157.1 R

[56] References Cited

U.S. PATENT DOCUMENTS

| | | | |
|---|---|---|---|
| 3,387,945 | 6/1968 | Boudry et al. | 423/10 |
| 3,620,687 | 11/1971 | Wilson | 423/10 |
| 3,949,049 | 4/1976 | Ochsenfeld et al. | 423/251 |
| 3,987,145 | 10/1976 | Bruns et al. | 423/10 |
| 4,080,273 | 3/1978 | De Poorter et al. | 204/157.1 R |

OTHER PUBLICATIONS

Streeton et al., "The Preparation, Stabilisation and Analysis of Uranium (IV) Nitrate Solutions," UKAEA Report, AERE R-3938, 1962.

Wick, "Plutonium Handbook," vol. II, p. 523, Gordon & Breach, (1967), New York.

Horner et al., "Laboratory Development of Solvent Extraction Processes for Spent LMFBR Fuels," ORNL/TM-5729, pp. 74, 75 & 90, Jan. 1977.

Bell et al., J. Inorg. Nucl. Chem., 38, 831–835, (1976).

*Primary Examiner*—Edward A. Miller
*Attorney, Agent, or Firm*—Dean E. Carlson; Stephen D. Hamel; Allen H. Uzzell

[57] ABSTRACT

The rate of reduction of Pu(IV) to Pu(III) in nitric acid solution containing a reducing agent is enhanced by exposing the solution to 200–500 nm electromagnetic radiation. Pu values are recovered from an organic extractant solution containing Pu(IV) values and U(VI) values by the method of contacting the extractant solution with an aqueous nitric acid solution in the presence of a reducing agent and exposing the aqueous solution to electromagnetic radiation having a wavelength of 200–500 nm. Under these conditions, Pu values preferentially distribute to the aqueous phase and U values preferentially distribute to the organic phase.

12 Claims, No Drawings

METHOD FOR SELECTIVELY REDUCING PLUTONIUM VALUES BY A PHOTOCHEMICAL PROCESS

BACKGROUND OF THE INVENTION

This invention was made in the course of, or under, a contract with the United States Energy Research and Development Administration. It relates in general to the art of nuclear fuel reprocessing and, more particularly, to the recovery of plutonium values from solutions containing plutonium and uranium values.

In the reprocessing of spent nuclear reactor fuels, spent fuel elements such as fuel rods are sheared and the powdered fuel material, usually oxides, carbides or nitrides are dissolved in nitric acid. This nitric acid solution contains U, Pu, Np and fission product values. The nitric acid dissolver is treated electrolytically or with an oxidizing agent such as nitrous acid or nitrite salts in order to oxidize Pu values to Pu(IV), which is more easily extracted by organic extractants. Other metal values are oxidized as well. Uranium and neptunium values are oxidized to U(VI) and Np(VI). The solution containing Pu(IV), U(VI) and other metal values is contacted with an organic extractant capable of preferentially extracting uranium values, neptunium values, and Pu(IV) values from the nitric acid. Suitable organic extractants include solutions of tri-n-butylphosphate in hydrocarbon diluents (TBP), methylisobutyl ketone (hexone) and butylcarbinol (butex).

Once the Pu(IV), U and Np values are distributed to the organic extractant, the Pu values are selectively stripped by contacting the loaded extractant solution with an aqueous nitric acid solution containing a reducing agent. Under these conditions, some of the Pu(IV) distributes to the aqueous phase in accordance with the stripping coefficient of the acid,

[Pu(IV)] aq./[Pu(IV)] org.

The stripping coefficient is less than 1, since Pu(IV) favors the organic phase. The ability of the aqueous nitric acid to strip Pu from the extractant is enhanced greatly by the presence of the reducing agent. In the aqueous phase, Pu(IV) is reduced to Pu(III), which favors the aqueous phase. As Pu(IV) is depleted from the aqueous solution by reduction, additional Pu(IV) enters from the organic phase to reestablish the Pu(IV) equilibrium between the phases. Actually, the Pu(III) values are practically insoluble in the organic extractant. The very low extraction coefficient of the organic extractant for Pu(III) results in a very high overall stripping efficiency for plutonium. This process is known as reductive stripping.

PRIOR ART

The present invention relates to reductive stripping of Pu values from organic extractants containing U(VI) and Pu(IV) values. Several such process methods are fully described in *Plutonium Handbook Vol. II*, O. J. Wick, Gordon and Breach, (New York) 1967, pp. 521-540, which is incorporated herein by reference. Prior art methods for recovering Pu values from organic extractants include stripping with aqueous solutions containing reductants such as ferrous sulfamate, U(IV), hydrazine, or hydrogen gas. A disadvantage with ferrous sulfamate reduction is that the process stream is contaminated, thus adding to the waste volume. Reduction with U(IV) requires a threefold excess which must be in the same or higher state of isotopic enrichment to avoid reducing the fuel value of reprocessed uranium. U(IV) reduction is not practical for multipurpose reprocessing facilities. Hydrazine reduction by itself is too slow to be practical. Hydrogen reduction is complicated by the explosion hazard of the gas and requires catalytic surface materials such as platinum.

SUMMARY OF THE INVENTION

It is an object of this invention to provide a process for enhancing the rate of reduction of Pu(IV) to Pu(III) in aqueous nitric acid solution containing a reducing agent.

It is a further object of this invention to provide a process for stripping Pu values from an organic extractant, which requires the addition of no reagents which add to the volume of solid wastes.

It is a further object to provide a process which can readily be carried out by remote operations and which requires no enriched uranium.

These and other objects are accomplished in a method for enhacing the rate of reduction of Pu(IV) to Pu(III) in a nitric acid solution containing Pu(IV) values, U(VI) values and hydrazine, said method comprising exposing said solution to a source of 200-500 nm electromagnetic radiation of sufficient intensity to cause Pu(IV) and U(VI) values in the solution to absorb at least 100 watts per mole of Pu(IV) per hour reduced. Pu values are recovered from an organic extractant having dissolved therein Pu(IV) and U(VI) values comprising the steps of:

a. contacting said organic extractant solution containing Pu(IV) and U(VI) values with an aqueous $HNO_3$ solution containing hydrazine whereby a portion of the Pu(IV) and U(VI) values distribute to the aqueous solution;

b. exposing said aqueous solution containing Pu(IV) and U(VI) values to a source of 200-500 nm electromagnetic radiation of sufficient intensity to cause Pu(IV) and U(VI) values to absorb at least 100 watts per mole per hour of Pu(IV) reduced to cause Pu values to preferentially distribute to said aqueous solution, whereby uranium values preferentially distribute to the organic extractant solution; and c. then separating the aqueous solution from the organic extractant.

DETAILED DESCRIPTION

It has been found according to this invention that electromagnetic radiation less than 350 nm activates plutonium so as to increase the rate of Pu(IV)→Pu(III) reduction in nitric acid containing hydrazine. It has also been found that electromagnetic radiation less than 500 nm activates uranyl ions so as to increase the rate of U(VI)→U(IV) reduction in nitric acid containing hydrazine. These discoveries can be utilized according to our invention in a reductive stripping process for recovering Pu values from an organic extractant containing U(VI) and Pu(IV) values.

An organic extractant useful for our process can be any of the well known metal extractants which is capable of extracting uranium and plutonium values from nitric acid solutions, and which has a higher extraction coefficient for Pu(IV), U(VI) and U(IV) than for Pu(III) from the particular acid concentration used. The greater the difference between the Pu(IV) and Pu(III)

extraction coefficients, the more efficient is our process. Suitable extractants include those used in prior art extraction processes such as TBP, Hexone, Butex, etc.

The first step in our process is to provide an organic extractant solution having dissolved therein Pu(IV) and U(VI) values. This can be provided simply by dissolving the proper salts in the extractant solution, or in a more useful context, by contacting the extractant with a nitric acid solution resulting from the dissolution of irradiated nuclear fuel, such as mixed uranium and plutonium oxides, $(U,Pu)O_2$. The $HNO_3$ concentration of the dissolver solution is typically 1.5 to 3.5 M in the Purex process. Pu is typically present in the dissolver solution as $PuO_2^{2+}$, and it is necessary to first adjust the valence of Pu to $Pu^{4+}$. This is normally accomplished by adding nitrite ion, either as $HNO_2$, a nitrite salt, or $NO_2$ gas to the dissolver solution. The reaction proceeds as follows:

$$PuO_2^{2+} + NO_2^- + 2H^+ \rightarrow Pu^{4+} + NO_3^- + H_2O \qquad (1)$$

Uranium is normally present in the dissolver solution as U(VI) and is essentially unaffected by nitrite addition. Upon contacting with organic extractant, Pu(IV) and U(VI) are extracted into the organic phase, leaving the bulk of the fission products in the aqueous phase.

The organic extractant loaded with Pu(IV) and U(VI) values (pregnant organic) is then contacted with nitric acid containing hydrazine (the stripping solution). The nitric acid concentration in this step is not critical to our process. While greater stripping coefficients are achieved with more concentrated $HNO_3$ solutions, the greatly enhanced stripping efficiency of the reductive stripping process permits the efficient use of less concentrated acid. The $HNO_3$ concentration in the stripping solution can be about 0.2–4, preferably 0.5–1.5, based upon other constraints of fuel reprocessing schemes. The hydrazine can be added as liquid $N_2H_4$. In the nitric acid solution it exists as dissociated hydrazine nitrate, $N_2H_5^+NO_3^-$.

Only a small portion of the Pu(IV) and U(VI) values will distribute to the stripping solution because both Pu(IV) and U(VI) favor the organic phase.

The stripping solution containing Pu(IV) and U(VI) values is exposed to electromagnetic radiation having a wavelength less than about 500 nm. Under these conditions, U(VI) in the aqueous phase is reduced to U(IV) which, in turn, reduces Pu(IV) in the aqueous phase to Pu(III). If the electromagnetic radiation has a wavelength less than about 350 nm, Pu(IV) is directly reduced to Pu(III) in stripping solution even if no U(IV) is present.

The beneficial results of our invention are best achieved when the stripping solution is in contact with the pregnant organic during irradiation. Under these conditions U(IV), as it is formed, is oxidized to U(VI), reducing Pu(IV) to Pu(III). Since Pu(IV) is continuously being removed from the stripping solution, the stripping solution continues to strip Pu(IV) from the extractant in an effort to achieve the (Pu(IV) aq.-/Pu(IV) org.) ratio dictated by the stripping coefficient of the acid/extractant system.

The reactions are believed to proceed as follows:

$$4 Pu^{4+} + N_2H_4 + h_\nu \rightleftarrows 4Pu^{3+} + N_2 + 4H^+ \qquad (2)$$

$$4 UO_2^{2+} + N_2H_4 + h_\nu \rightleftarrows 4 UO_2^+ + N_2 + 4H^+ \qquad (3)$$

$$2 UO_2^+ + 4H^+ \rightleftarrows U^{4+} + UO_2^{2+} + 2H_2O \qquad (4)$$

$$2 Pu^{4+} + U^{4+} + 2H_2O \rightleftarrows 2Pu^{3+} + UO_2^{2+} + 4H^{30} \qquad (5)$$

In addition, $N_2H_4$ suppresses the formation of nitrites during the photochemical reaction. $Pu^{3+}$ is unstable in the presence of nitrite ion. The formation of nitrite is suppressed by the reaction $$N_2H_5^+ + HNO_2 \rightleftarrows HN_3 + 2H_2O + H^+ \qquad (6)$$

followed by:

$$HN_3 + HNO_2 \rightleftarrows N_2O + N_2 + H_2O \qquad (7)$$

As shown in reaction 2, the $N_2H_4$ requirement in the stripping solution for Pu(IV) reduction is ¼ the molar concentration of Pu(IV) in the extractant solution. Excess $N_2H_4$ is desirable to stabilize Pu(III) by suppression of nitrite formation (reactions 6 and 7). For the reduction of Pu(IV) via reactions 3, 4 and 5, the U(VI) functions catalytically and should be present in an effective catalytic amount, generally at least about 1/10 the molar concentration of Pu(IV). In extractant solutions from initial spent light water reactor fuel dissolutions, the U(VI) concentration is typically 10 times the Pu(IV) concentration.

The effective range of electromagnetic radiation wavelength is 200–500 nm. Wavelengths above 500 nm do not activate the separation because U(VI) has a low absorbtion coefficient. At wavelengths of incident radiation between 350 nm and 500 nm Pu(III) is provided by reactions 3, 4 and 5. At wavelengths less than 350 nm reaction 2 contributes significantly. Below about 200 nm much of the radiation is absorbed by oxygen, water and other components.

The rate of Pu(IV) reduction is directly proportional to the amount of radiation absorbed by the reacting species Pu(IV) and U(VI). In order to significantly enhance the rate of Pu(IV) → Pu(III) reduction over that occurring in darkness or normal laboratory illumination, the amount of radiation absorbed must be at least 100 watts per mole per hour of Pu(IV) reduced. Normal inside illumination is about 1 mW/in². The minimum source intensity then is that sufficient to cause Pu(IV) and U(VI) values in the solution to absorb at least 100 watts per mole of Pu(IV) reduced per hour. The source intensity needed for a particular system will be dependent upon the absorbance of the solution, the amount of other absorbing species present, the optical path length through the solution, the area illuminated, and, in a continuous process, the flow rate of the solution. For an efficient industrial scale operation, the radiation absorbed by the reacting species should be at least 1000 watts per mole per hour of Pu(IV) reduced. Since Pu(III) is not back extracted to the organic extractant to any significant degree, and U(VI) and U(IV) both favor the organic extractant, the overall effect of the electromagnetic radiation is to cause Pu values from the organic extractant to preferentially distribute to the aqueous acid solution, while uranium values preferentially distribute to the organic extractant. Furthermore, the presence of Np(VI) in the extractant should not interfere with the Pu(III) separation because Np(VI) will be photoreduced to Np(IV) which will favor the organic phase. The aqueous solution is then separated from the organic extractant, and the streams are subjected to further processing in accordance with a variety of well-established fuel reprocessing flowsheets, such as are described, for example, in Long, Justin T. *Engineering for Nuclear Fuel Reprocessing*, Gordon and Breach, New York (1967).

It can be readily seen that the aqueous and organic phases can be separated prior to exposure to the electromagnetic radiation, and again contacted with the organic extractant to strip more Pu(IV). This would be a markedly less efficient stripping process than that described above. The electromagnetic radiation does not reduce the Pu values in the organic solution. It is preferred that the extractant be substantially shielded from the radiation to prevent photolytic degradation of the extractant.

As an alternative to stripping Pu values from the organic extractant, the oxidized dissolver solution containing hydrazine can be exposed to 200–500 nm radiation prior to extraction. Pu(IV) would be reduced to Pu(III) which would not be extracted with U and Np values. Incident radiation of higher intensity would be needed for a dissolver solution than for a stripping solution due to the presence of fission products which absorb radiation. Example 1 demonstrates the effect of light of about 300 nm on the reduction of Pu(IV) to Pu(III) in $HNO_3$ solution containing hydrazine.

EXAMPLE 1

A plutonium nitrate solution containing 0.0059 M Pu(IV) in 1.2 M $HNO_3$ and 0.5 M hydrazine nitrate, $N_2H_2.HNO_3$, was followed spectrophotometrically by monitoring the 476 nm band of Pu(IV) first under dark conditions and then under exposure to light of approximately 1 watt intensity ($\lambda$ = 300 nm). The volume of solution exposed was 8 ml. For both the light and dark intervals, reduction to Pu(III) was observed as presented in the following table:

Table 1

| Time After Mixing Constituents | Light(L) or Dark(D) Conditions | Percent Pu(IV) Found | Rate of Change $\Delta Pu(IV)/\Delta t$ For immediate Interval |
|---|---|---|---|
| 0 | | 100 | |
| 30 | D | 91 | .30 |
| 60 | D | 83 | .27 |
| 70 | L | 65 | 1.80 |
| 90 | L | 50 | .75 |
| 110 | D | 49 | .05 |

As can be seen, the rate of Pu(IV) reduction was accelerated by as much as 6 times on exposure to UV radiation.

Example 2 demonstrates the effects of electromagnetic radiation on the distribution of Pu values between an organic extractant and a $HNO_3$ stripping solution containing hydrazine.

EXAMPLE 2

Two aliquots of 7.7 ml. each of an aqueous solution containing 0.0037 M Pu(IV) and 0.0047 M U(VI) in 1.4 M $HNO_3$ and 0.5 M hydrazine nitrate were designated as light and dark samples, respectively. The absorbtion spectra of each solution were measured and thereby shown to contain all of the U values as U(VI) and all of the Pu values as Pu(IV). The light aliquot was exposed to 1 watt of UV radiation for 30 minutes ($\lambda$ max = 300 nm with a half width at half height of 100 nm). In order to make the separation more favorable, the $HNO_3$ concentration was increased to 2.6 M $HNO_3$ by adding 1.3 ml. concentrated $HNO_3$ solution to each aliquot. Each aliquot was shaken with 9 ml. of a 30% tri-n-butylphosphate-dodecane solution. The two phases of each sample (aqueous and organic) were separated and the absorbtion spectra measured to determine the respective concentration of Pu and U. In addition to the spectrophotometric determinations, chemical analyses were performed which supported the spectral measurements.

Table 2

| Uranium-Plutonium Values Distribution (wt. %) | |
|---|---|
| Dark Sample After 1.5 Hours | Light Sample After 0.5 Hours Light Exposure Followed by 1.0 Hours in Dark |
| Aqueous Layer 3%U; 33% Pu(VI) | Aqueous Layer 3%U; 90% PO(III) |
| Organic Layer 97%U; 67% Pu(IV) | Organic Layer 97%U; 10% Pu(IV) |

It is seen that Pu values distribute preferentially to the aqueous phase as Pu(III) and U values distribute to the organic phase as U(VI). The marked enhancement of the overall stripping efficiency, [$\Sigma$Pu aq.]/[$\Sigma$Pu org.], of the nitric acid containing hydrazine was unexpected and surprising. In the absence of a reducing agent such as hydrazine, UV radiation had no measured effect on the Pu oxidation state in $HNO_3$. While electromagnetic radiation has been known to enhance a variety of redox reactions, it cannot be predicted what effect, if any, it would have on redox reactions occurring in nitric acid solution, since $HNO_3$ has high absorbance at 302 nm and is itself a strong oxidizing agent. For example, P.N. Palei and others in *Radiokhimiya* 11(3), 300–307 (May--June 1969) concluded that Pu was oxidized in acid by ultraviolet radiation.

The photochemical reductive stripping process of this invention is readily achieved without the addition of chemicals which add to the radioactive waste volume. Any conventional source of radiation in the 200–500 nm range is suitable for the process. In addition to hydrazine, other reducing agents which are effective for reducing Pu(IV) in $HNO_3$ are effective in this process. Preferably, the reducing agents should have a low absorbance for the radiation and should decompose without forming undesirable products in the stripping solution or subsequently reducing other actinide species. Such reducing agents include hydroxylamine and formic acid and are contemplated as equivalents of hydrazine for purposes of this process.

What is claimed is:

1. A method for enhancing the rate of reduction of Pu(IV) to Pu(III) in an aqueous nitric acid solution having dissolved therein hydrazine, Pu(IV) values, and U(VI) values, said method comprising exposing said solution to a source of 200–500 nm electromagnetic radiation of sufficient intensity to cause Pu(IV) and U(VI) values in said solution to absorb at least 100 watts per mole per hour of Pu(IV) reduced.

2. The method of claim 1 wherein said electromagnetic radiation is 200–350 nm.

3. The method of claim 1 wherein said nitric acid concentration is 0.2–4 M.

4. The method of claim 1 wherein said radiation is of sufficient intensity to cause said Pu(IV) and U(VI) values to absorb at least 1000 watts per mole per hour of Pu(IV) reduced.

5. A method for recovering Pu values from an organic extractant solution having dissolved therein Pu(IV) and U(VI) values, comprising the steps of:
   a. contacting said organic extractant solution containing Pu(IV) and U(VI) values with an aqueous HNO₃ solution containing hydrazine whereby a portion of the Pu(IV) and U(VI) values distribute to the aqueous solution;

b. exposing the aqueous solution containing Pu(IV) and U(VI) values to a source of 200–500 nm electromagnetic radiation of sufficient intensity to cause Pu(IV) and U(VI) values in said aqueous solution to absorb at least 100 watts per mole per hour of Pu(IV) reduced to enhance the rate of reduction of Pu(IV) to Pu(III) in said aqueous solution and cause Pu values to preferentially distribute to said aqueous solution whereby uranium values preferentially distribute to the organic extractant solution, said organic extractant solution being substantially shielded from said electromagnetic radiation to prevent photolytic degradation of said organic extractant; and c. then separating the aqueous solution from the organic extractant solution.

6. The method of claim 5 wherein said HNO₃ concentration is 0.2 to 4 M.

7. The method of claim 5 wherein said electromagnetic radiation is 200–350 nm.

8. The method of claim 5 wherein said electromagnetic radiation is of sufficient intensity to cause said Pu(IV) and U(VI) values to absorb at least 1000 watts per mole per hour of Pu(IV) reduced.

9. The method of claim 5 wherein said electromagnetic radiation is 350–500 nm.

10. The method of claim 1 wherein said electromagnetic radiation is 350–500 nm.

11. The method of claim 1 wherein said HNO₃ concentration is 0.5–1.5 M.

12. The method of claim 5 wherein said HNO₃ concentration is 0.5–1.5 M.

* * * * *